(12) United States Patent
Beckwith et al.

(10) Patent No.: US 9,047,703 B2
(45) Date of Patent: Jun. 2, 2015

(54) AUGMENTED REALITY HEADS UP DISPLAY (HUD) FOR LEFT TURN SAFETY CUES

(71) Applicants: Lee Beckwith, Palo Alto, CA (US); Victor Ng-Thow-Hing, Sunnyvale, CA (US)

(72) Inventors: Lee Beckwith, Palo Alto, CA (US); Victor Ng-Thow-Hing, Sunnyvale, CA (US)

(73) Assignee: Honda Motor Co., Ltd., Tokyo (JP)

( * ) Notice: Subject to any disclaimer, the term of this patent is extended or adjusted under 35 U.S.C. 154(b) by 267 days.

(21) Appl. No.: 13/800,822

(22) Filed: Mar. 13, 2013

(65) Prior Publication Data

US 2014/0267263 A1 Sep. 18, 2014

(51) Int. Cl.
*G06T 15/08* (2011.01)
*G06T 19/00* (2011.01)

(52) U.S. Cl.
CPC ............... *G06T 15/08* (2013.01); *G06T 19/006* (2013.01); *B60R 2300/205* (2013.01)

(58) Field of Classification Search
USPC ........... 345/7, 629, 633; 340/425.5, 435, 436, 340/901
See application file for complete search history.

(56) References Cited

U.S. PATENT DOCUMENTS

| | | | |
|---|---|---|---|
| 5,519,536 A | 5/1996 | Hoehn | |
| 6,727,807 B2 | 4/2004 | Trajkovic et al. | |
| 6,919,866 B2 | 7/2005 | Kanevsky et al. | |
| 7,561,966 B2 | 7/2009 | Nakamura et al. | |
| 7,605,773 B2 | 10/2009 | Janssen | |
| 7,680,592 B2 | 3/2010 | Ikeda | |
| 7,815,313 B2 | 10/2010 | Ito et al. | |
| 7,847,678 B2 | 12/2010 | Kawamata et al. | |
| 8,009,024 B2 | 8/2011 | Enya et al. | |
| 8,035,493 B2 | 10/2011 | Hioki | |
| 8,049,609 B2 | 11/2011 | Takahashi et al. | |
| 8,138,990 B2 | 3/2012 | Kakizaki | |
| 8,144,076 B2 | 3/2012 | Kakizaki | |
| 2005/0134479 A1 | 6/2005 | Isaji et al. | |
| 2005/0149251 A1 | 7/2005 | Donath et al. | |
| 2006/0103590 A1 | 5/2006 | Divon | |
| 2006/0151223 A1 | 7/2006 | Knoll | |
| 2008/0015772 A1* | 1/2008 | Sanma et al. ............... 701/207 |
| 2008/0133136 A1* | 6/2008 | Breed et al. ................ 340/435 |
| 2009/0058761 A1 | 3/2009 | Chen et al. | |
| 2010/0157430 A1 | 6/2010 | Hotta et al. | |
| 2010/0253489 A1* | 10/2010 | Cui et al. .................. 340/425.5 |

(Continued)

OTHER PUBLICATIONS

Tran, Cuong et al., "A Left-Turn Driving Aid Using Prjected Oncoming Vehicle Paths with Augmented Reality", Proceedings of the 5th Internation Conference on Automotive User Interfaces and Interactive Vehicular Applications, Oct. 28-30, 2013, p. 300-307.*

*Primary Examiner* — Chante Harrison
(74) *Attorney, Agent, or Firm* — Kegler Brown Hill & Ritter; James J. Pingor

(57) ABSTRACT

A method, augmented reality driving system and device safely guide a vehicle driver to perform a left turn. A vehicle navigator detects a left turn based upon proximity and speed for a vehicle. A target sensor determines a current position and a relative vector for an oncoming vehicle in a lane for opposing traffic that is approaching the left turn. An augmented reality controller three dimensionally maps a forward view including the oncoming vehicle and spatially overlays an augmented reality display on a volumetric heads up display for a driver of the vehicle by projecting a target path of the oncoming vehicle based upon the vector and relative vector and by projecting a left turn path.

20 Claims, 10 Drawing Sheets

(56) References Cited

U.S. PATENT DOCUMENTS

| | | |
|---|---|---|
| 2011/0128139 A1 | 6/2011 | Tauchi et al. |
| 2012/0154441 A1 | 6/2012 | Kim |
| 2012/0200476 A1 | 8/2012 | Kanamori et al. |
| 2012/0206483 A1* | 8/2012 | Funabashi ................. 345/629 |
| 2012/0224062 A1 | 9/2012 | Lacoste et al. |
| 2012/0249589 A1 | 10/2012 | Gassner et al. |
| 2014/0063064 A1* | 3/2014 | Seo et al. ................... 345/633 |
| 2014/0267398 A1* | 9/2014 | Beckwith et al. ........... 345/633 |
| 2014/0268353 A1* | 9/2014 | Fujimura et al. ............ 359/630 |
| 2014/0362195 A1* | 12/2014 | Ng-Thow-Hing et al. ..... 348/51 |

* cited by examiner

AUGMENTED REALITY HEADS UP DISPLAY (HUD) FOR LEFT TURN SAFETY CUES

BACKGROUND

Most drivers believe they are better than average at driving. In fact, many people routinely behave badly behind the wheel because their behavior goes uncorrected, even though a single mistake can lead to deadly consequences. To help train drivers, generally-known systems provide feedback on driver performance via a voice system. Alternatively, other generally-known systems provide a text display that can distract the driver rather than effectively prompting the driver toward a safe driving behavior.

SUMMARY

The following presents a simplified summary of the disclosure in order to provide a basic understanding of some aspects of the disclosure. This summary is not an extensive overview of the disclosure. It is not intended to identify key/critical elements of the disclosure or to delineate the scope of the disclosure. Its sole purpose is to present some concepts of the disclosure in a simplified form as a prelude to the more detailed description that is presented later.

This disclosure, as claimed herein, in one aspect thereof, includes a method for safely guiding a vehicle driver to perform a left turn by detecting a left turn based upon proximity and speed for a vehicle, determining a current position and a relative vector for an oncoming vehicle in a lane for opposing traffic that is approaching the left turn, three dimensionally mapping a forward view including the oncoming vehicle, and spatially overlaying an augmented reality display on a volumetric heads up display for a driver of the vehicle by projecting a target path of the oncoming vehicle based upon the vector or the relative vector and by projecting a left turn path.

In another aspect of the subject disclosure, an augmented reality driver system safely guides a vehicle driver to perform a left turn. A vehicle navigator detects a left turn based upon proximity and speed for a vehicle. A target sensor determines a current position and a relative vector for an oncoming vehicle in a lane for opposing traffic that is approaching the left turn. An augmented reality controller three dimensionally maps a forward view including the oncoming vehicle and directs a volumetric heads up display to project a target path of the oncoming vehicle based upon the vector or the relative vector, and to direct the volumetric heads up display to project a left turn path for the vehicle.

In yet another aspect thereof, a device safely guides a vehicle driver to perform a left turn. A controller is in communication with a volumetric heads up display. The controller comprises at least one processor that executes software instructions to perform operations comprising detecting a left turn based upon proximity and speed for a vehicle, determining a current position and a relative vector for an oncoming vehicle in a lane for opposing traffic that is approaching the left turn, three dimensionally mapping a forward view including the oncoming vehicle, and spatially overlaying an augmented reality display on the volumetric heads up display for a driver of the vehicle by projecting a target path of the oncoming vehicle based upon the vector or the relative vector and by projecting a left turn path.

To the accomplishment of the foregoing and related ends, certain illustrative aspects of the disclosure are described herein in connection with the following description and the annexed drawings. These aspects are indicative, however, of but a few of the various ways in which the principles of the disclosure can be employed and the subject disclosure is intended to include all such aspects and their equivalents. Other advantages and novel features of the disclosure will become apparent from the following detailed description of the disclosure when considered in conjunction with the drawings.

DETAILED DESCRIPTION

Figure 1:
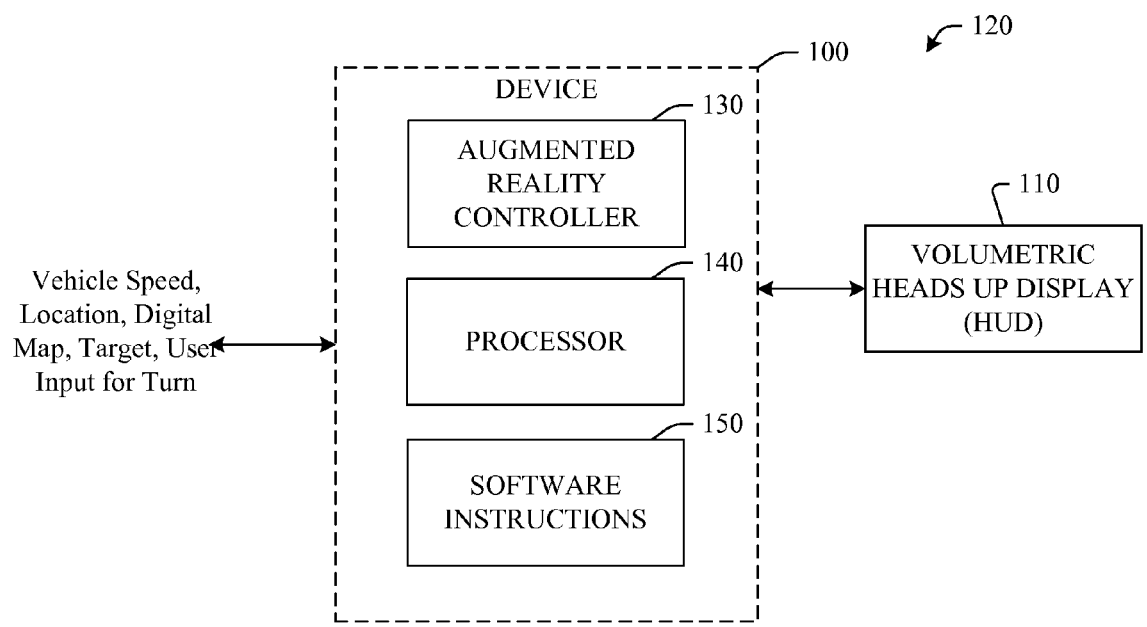
FIG. 1 illustrates a block diagram of a device for using augmented reality to safely guide a driver through a left turn according with an aspect of the disclosure.

This disclosure contributes a proactive strategy for counteracting unsafe driving habits. A driver influence/inference cycle is proposed as a model that describes three levels of perception and behavior while driving. Augmented reality is used to design visual stimuli at the lowest, immediate level of perception and provide visual feedback that positively reinforces higher levels of behavior. Consequently, the issue of safety at all levels of perception and behavior is addressed in order to improve driving over both the short and long-term. This approach of using the three-level model to create driver engagement and learning is illustrated with design concepts using a prototype of a volumetric Heads Up Display (HUD) to present left turn guides.

Augmented reality (AR) can change the "rules of the game" of the road, so that the attention of the commuter is changed to one that exhibits both safe/defensive driving as well as a hyper-focused, "flow" state that is rewarding for the driver. In effect, the driving experience is "game-ified", not towards aggression, but mastery of the primary driving task, especially with respect towards safe and considerate driving. This perspective suggests that AR can alter one's view of reality in a very personalized way. For instance, drivers who have a display in fuel-efficient vehicles that measure their gas mileage can be motivated to achieve higher fuel efficiency. This is a small example of how constant feedback, goals, and challenge can create positive engagement on the part of the driver. Visual feedback of AR allows unambiguous notifications in context to the environment. This feedback allows higher-level goals and reinforcement mechanisms to be active while driving.

Since HUDs are an emerging technology, many different approaches can be made in how this technology is used in the car. Without proper attention towards the causes of safety and distraction, some can be tempted to design applications of the HUD for secondary tasks such as calendar lookups or video calls. It is critical to the safety of road users that a system motivated by solving driver distraction via engagement is introduced first in HUDs. Deploying HUDs toward the purpose of saving lives by transforming the attention of drivers towards the primary task of driving is an approach that takes precedence over adding more secondary task functionality to HUDs. Not only can 3-D augmented reality in the car help drivers maintain safe behavior, but it also has the possibility to positively and significantly transform the relationship between drivers, cars, and everyone who shares the streets.

In one exemplary aspect, AR can be employed for (1) displaying a visual warning comprised of a color coded path projected in front of an oncoming vehicle; (2) calculating whether it is safe to make a left turn; and (3) displaying a color coded representation when it is safe to make the turn (e.g., displaying a path (driver line) for the driver of the vehicle to follow when making the left hand turn). A visual warning appears on a display in front of the driver to warn the driver of oncoming traffic without distracting the driver, such as forcing the driver to read text at a different focal position to the oncoming traffic. While many of the aspects described herein are specifically related to left hand turns, it is to be appreciated that other scenarios exist which are to be included within the scope of this disclosure and claims appended hereto.

Specifically, the visual warning can be a color coded path projected in front of an oncoming car. The color coded path can be essentially attached to the front of the oncoming car and is typically set at three (3) seconds (or the like) in front of the oncoming car using the current speed and direction of the vehicle. The width of the path can be fixed at approximately one car width. Alternatively, a particularly large vehicle, such as an oversize load that imperils more than one lane, can be detected and depicted as wider width of path. Alternatively or in addition, an undersized vehicle or cyclist can have an increased width of path to ensure detection.

In this disclosure, a different image or representation turns on and is present when the driver is making a left turn. For instance, a driver line can become shorter when the driver is making the left hand turn. In addition, the system can calculate whether it is safe to turn and display a color coded representation or path (e.g., driver line) for the driver to follow when it is safe to make the turn.

The disclosure is now described with reference to the drawings, wherein like reference numerals are used to refer to like elements throughout. In the following description, for purposes of explanation, numerous specific details are set forth in order to provide a thorough understanding of the subject disclosure. It can be evident, however, that the disclosure can be practiced without these specific details. In other instances, well-known structures and devices are shown in block diagram form in order to facilitate describing the disclosure.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to the drawings, FIG. 1 illustrates a device 100 for safely guiding a vehicle driver to perform a left turn. The device 100 is in communication with a volumetric heads up display (HUD) 110, both of an augmented reality driver system 120. An augmented reality controller ("controller") 130 has at least one processor 140 that executes software instructions 150 to perform operations of: detecting a left turn based upon proximity and speed for a vehicle, determining a current position and a relative vector for an oncoming vehicle in a lane for opposing traffic that is approaching the left turn, three dimensionally mapping a forward view including the oncoming vehicle, and spatially overlaying an augmented reality display on the volumetric heads up display for a driver of the vehicle by projecting a target path of the oncoming vehicle based upon the vector or the relative vector and by projecting a left turn path.

In one aspect consistent with at least one version of the present disclosure, the controller 130 performs operations of projecting the target path for a calculated time in which the vehicle will cross the opposing left during the left turn.

In another aspect consistent with at least one version of the present disclosure, the controller 130 performs operations of overlaying the augmented reality display with an extended left turn graphic in response to determining a nonintersecting path and with a shortened left turn in response to determining an intersecting path.

In an additional aspect consistent with at least one version of the present disclosure, the controller 130 performs operations of detecting the left turn further by accessing a digital map, a location of the vehicle, and a current trajectory of the vehicle, and receiving a user input indicative of a planned left turn. For example, the user input indicative of the planned left turn can be by receiving a route map based upon the digital map. Alternatively or in addition, receiving the user input indicative of the planned left turn can be by receiving a left turn signal.

Figure 2:
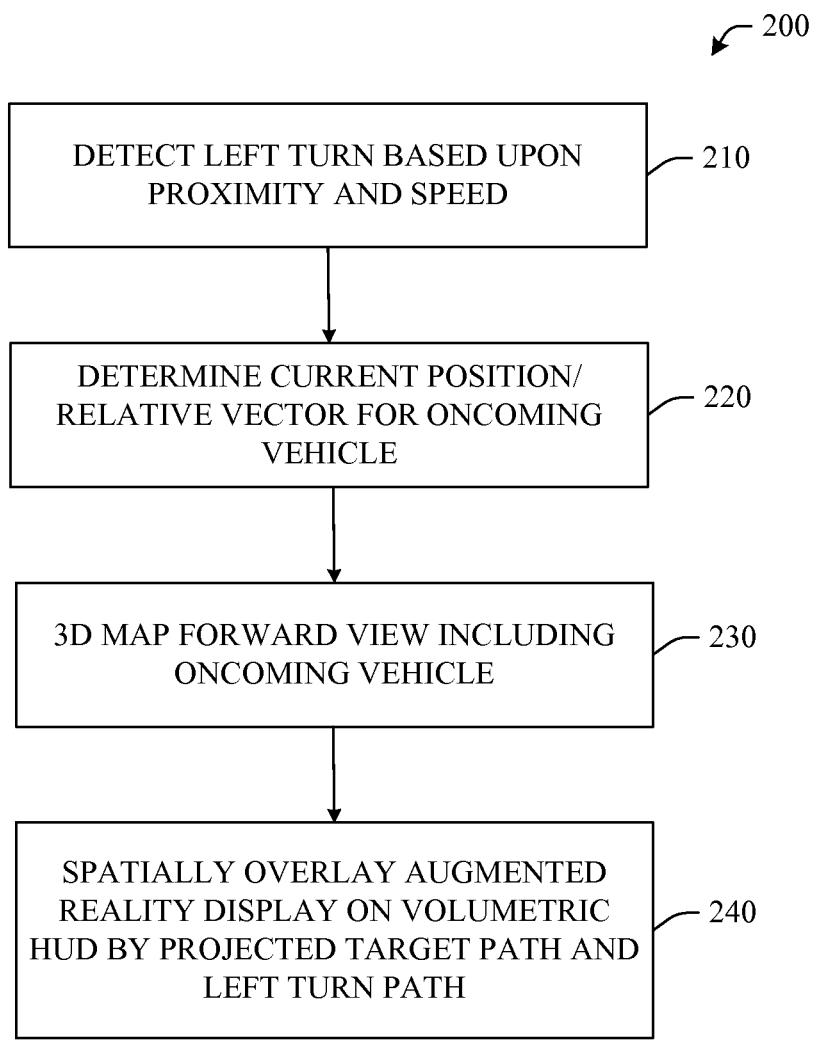
FIG. 2 illustrates an example flow chart of operations that facilitate augmented reality for a safe left turn in accordance with an aspect of the disclosure.

FIG. 2 illustrates a methodology of 200 in accordance with an aspect of the disclosure for safely guiding a vehicle driver to perform a left turn. In block 210, a left turn is detected based upon proximity and speed for a vehicle. In block 220, a current position and a relative vector is determined for an oncoming vehicle in a lane for opposing traffic that is approaching the left turn. In block 230, a forward view is three dimensionally mapped, including the oncoming vehicle. In block 240, an augmented reality display is spatially overlaid on a volumetric heads up display for a driver of the vehicle by projecting a target path of the oncoming vehicle based upon the vector or the relative vector and by projecting a left turn path.

According to one aspect of at least one version of the disclosure, the methodology 200 can include projecting the target path for a calculated time in which the vehicle will cross the opposing left during the left turn.

According to another aspect of at least one version of the disclosure, the methodology 200 can include overlaying the augmented reality display with an extended left turn graphic in response to determining a nonintersecting path and with a shortened left turn in response to determining an intersecting path.

According to an aspect of at least one version of the disclosure, the methodology 200 can include detecting the left turn further comprises accessing a digital map, a location of the vehicle, and a current trajectory of the vehicle, and receiving a user input indicative of a planned left turn. For example, receiving the user input indicative of the planned left turn can be by receiving a route map based upon the digital map. Alternatively or in addition, receiving the user input indicative of the planned left turn can be by receiving a left turn signal. In some aspects where data supporting determination of a turn lane is conflicting (e.g., route data indicates a left turn, but the driver has activated a right turn signal, etc.), yielding indication can be provided for each possible turn lane. In other such aspects, however, a determination can be made of a more likely turn lane based on a first set of information being more relevant than a second set (e.g., turn signal activation may be regarded as more relevant than route map information, or vice versa, vehicle speed and proximity can be regarded as more relevant than turn signal information, or vice versa, etc.), and yielding indication can be provided for less than all possible turn lanes (where, as discussed above, "turn lanes" can include lanes that continue straight, etc.). In further aspects, machine learning (e.g., classifiers, etc.) can be employed to determine most likely travel directions corresponding to conflicting or ambiguous inputs.

While, for purposes of simplicity of explanation, the one or more methodologies shown herein, e.g., in the form of a flow chart, are shown and described as a series of acts, it is to be understood and appreciated that the subject disclosure is not limited by the order of acts, as some acts can, in accordance with the disclosure, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with the disclosure.

Figure 3:
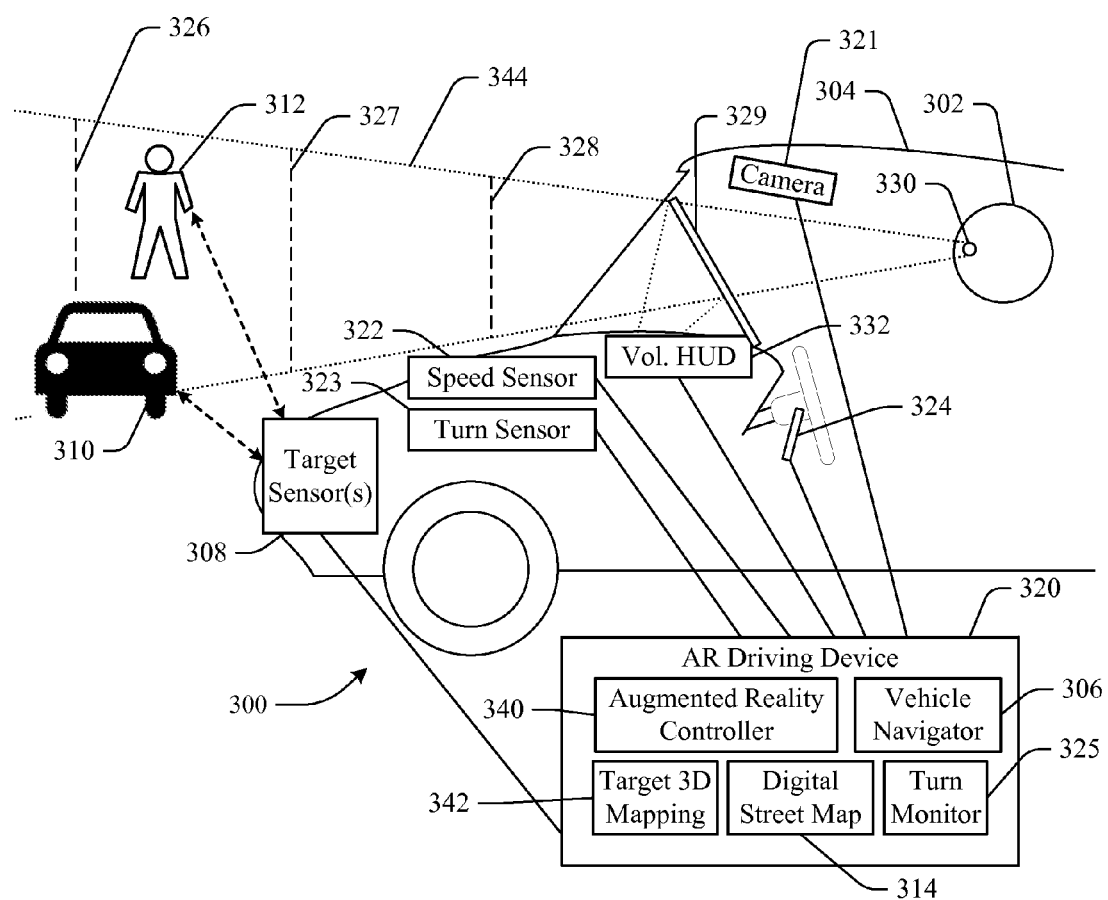
FIG. 3 illustrates a side view in cross section of a front portion of vehicle and a block diagram of an augmented reality driving system according to an exemplary aspect of the disclosure.
Figure 4:
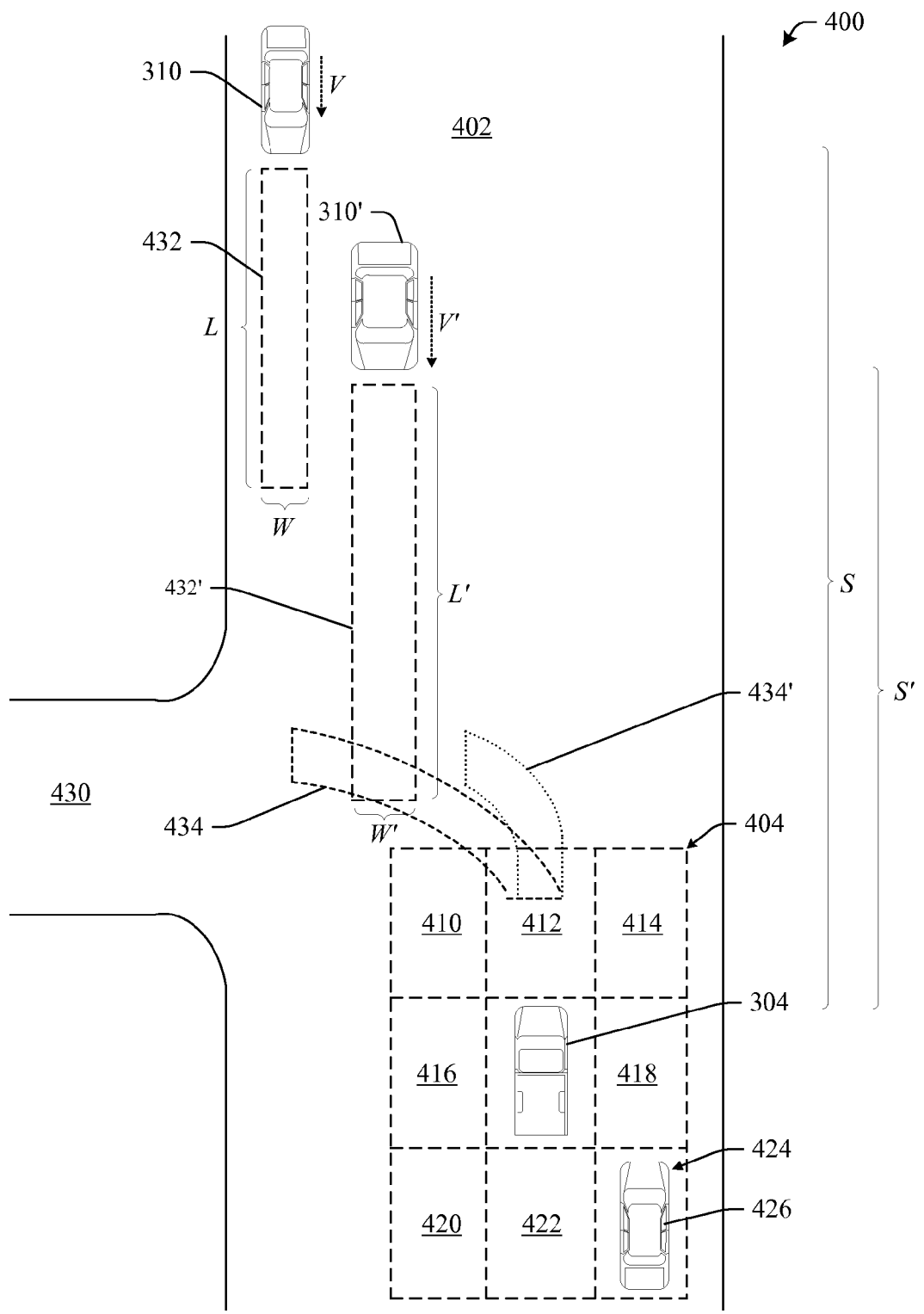
FIG. 4 illustrates a top view of a road with two illustrative instances of augmented reality for safely guiding a left turn.
Figure 5:
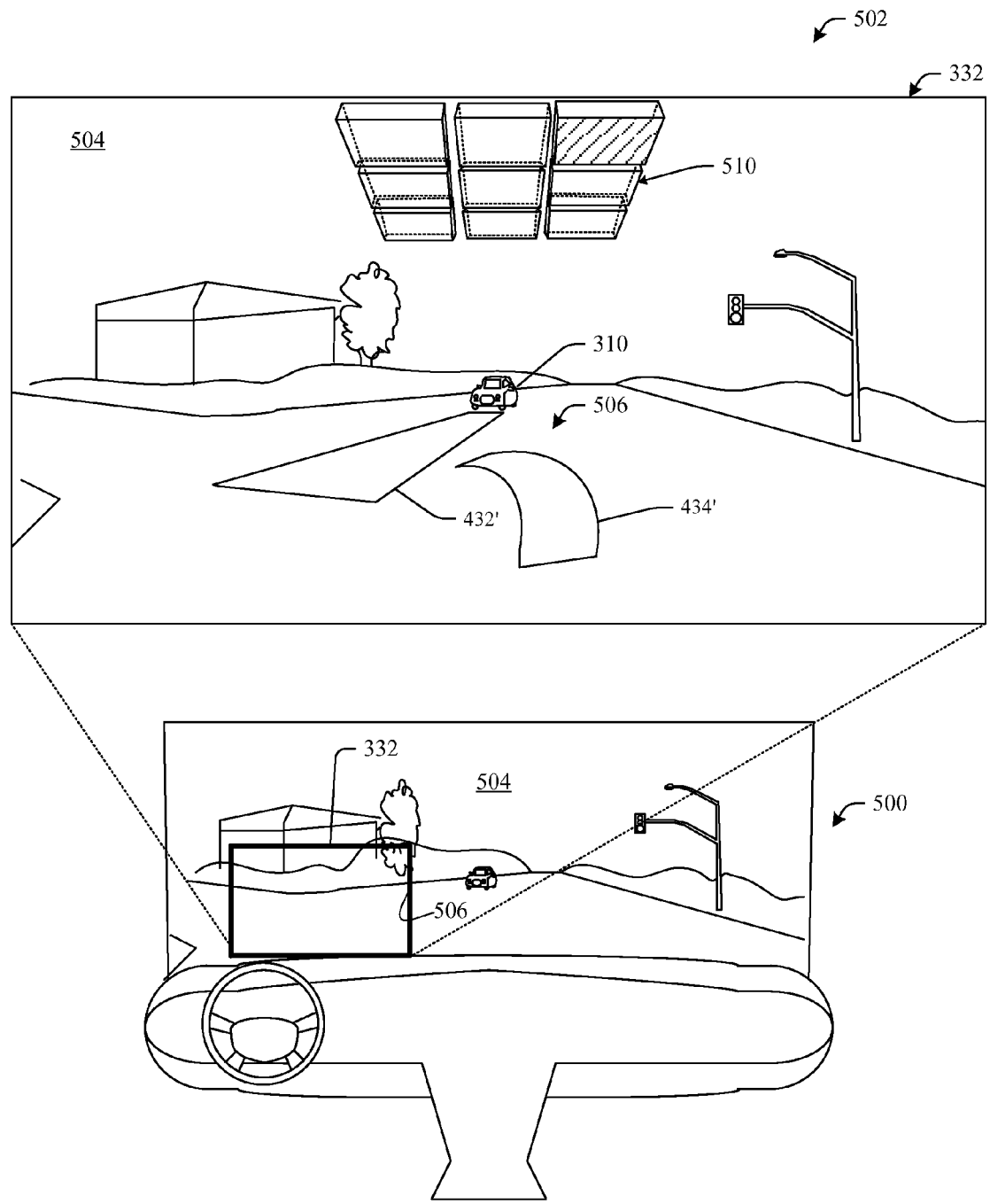
FIG. 5 illustrates a front view from a vantage point of a driver assisted by the augmented reality display

Referring now to FIGS. 3-5, an exemplary augmented reality driver system 300 to safely guide a driver 302 of a vehicle 304 to perform a left turn is depicted for clarity as a distributed system of several components carried by a vehicle 304; however, it will be appreciated with the benefit of the disclosure that the functions can be integrated into one or more devices. In addition, certain functions or components can be remote to the vehicle 304.

With particular reference to FIG. 3, a vehicle navigator 306 detects a left turn, for example, based upon proximity and speed for the vehicle 304. Target sensor(s) 308 determine a current position and a relative vector for an oncoming vehicle 310 in a lane for opposing traffic that is approaching the left turn. The target sensor 308 can also detect pedestrians 312. Current position and proximity can be determined, for example, by accessing a digital street map 314 used by the vehicle navigator 306.

An augmented reality (AR) driving device 320 is in communication with one or more sensors or controls in the vehicle 304, such as the target sensor(s) 308, a camera 321 for detecting driver head/eye position, vehicle speed sensor 322, a turn sensor 323, and a turn signal 324. For example, a turn monitor 325 of the AR driving device 320 can determine that a left turn is planned due to one or more user inputs such as an accepted route in the vehicle navigator 306, speed or steering inputs to the turn sensor 323, and actuation of the turn signal 324.

A volumetric heads up display (HUD) 332 is capable of projecting multiple focal planes 326-328 including a ground plane 329 with respect to a vantage point 330 of the driver 302.

Although not depicted, the volumetric HUD 332 can be employed in simulated driving setup wherein synchronized video is projected onto the volumetric HUD 332, consisting only of the augmented computer graphic visuals. Seen together, designers or drivers in training can visualize a combined image. Displaying AR directly on the volumetric HUD 332 can achieve a higher level of fidelity than if overlaying the computer graphics directly on a driving scenery video.

An augmented reality controller 340 can have a target 3D mapping component 342 to three dimensionally map a forward view 344 including the oncoming vehicle, to direct the volumetric heads up display to project a target path of the oncoming vehicle based upon the vector or the relative vector, and to direct the volumetric heads up display 332 to project a left turn path for the vehicle 304.

With particular reference to FIG. 4, an illustrative scenario 400 is depicted looking down upon the vehicle 304 traveling on a current road 402. For enhanced situational awareness, the vehicle 304 monitors vehicles within a safety grid 404 around the vehicle 304, depicted as front left section 410, front center section 412, front right section 414, left side section 416, right side section 418, rear left section 420, rear center section 422, and rear right section 424. For example, a trailing vehicle 426 in a blind spot of the rear right section 424 can be communicated to the driver 302.

A planned left turn is determined onto a road 430. In a first instance, consider the oncoming vehicle 310 at a relative distance S has a velocity V and a width W. A target path 432 is depicted that can have the same width W and a length L that is calculated based upon a preset time and the velocity V. Alternatively, the time value used can be based upon the dynamically calculated time that the vehicle 304 can complete the left turn. For this first instance, a left turn path 434 can be depicted those shows no intersection with the oncoming vehicle 310. The left turn path 434 conveys that it is safe to turn.

By contrast, consider a second instance also shown on FIG. 4, wherein an oncoming vehicle 310' is at a closer relative distance S' and travels at a greater velocity V'. The oncoming vehicle 310' also has a different width W'. For this second instance, a left turn path 434' can be depicted those shows no intersection with the oncoming vehicle 310'. The left turn path 434' conveys that it is not safe to turn, which in the illustrative depiction is a shortened left turn path that does not cross the target path 432'.

With particular reference to FIG. 5, an interior portion 500 of the vehicle 304 as viewed by the driver is depicted. The volumetric heads up display 332 creates an augmented reality display 502 of the unaltered front view 504 as well as an overlaid view 506 that appears to be at one or more focal planes. A safety grid 510 can also be depicted in the augmented reality display 502.

With the availability of heads-up displays (HUDs) combined with augmented reality (AR), the potential exists to alter the driver's perception of the road environment to improve safe driving behavior. An augmented reality display can project visual information into the driver's field of view, creating the possibility for a completely immersive experience. The driver's eyes can remain on the road, and information is presented in the same three dimensional, visual world as the driving situation, as opposed to voice or secondary displays. In such an AR environment, both suggested actions and immediate feedback of performance could be presented in context with the actual road scene and relevant objects in the scene, such as cars, lanes, or pedestrians. The disclosure presents a model that describes what causes unsafe situations, such as distraction or aggressive driving, and using this same model, the present disclosure presents a strategy using visual positive feedback to engage and train the driver to adopt safer driving behavior while providing specialized visual guidance for various driving tasks.

Figure 6:
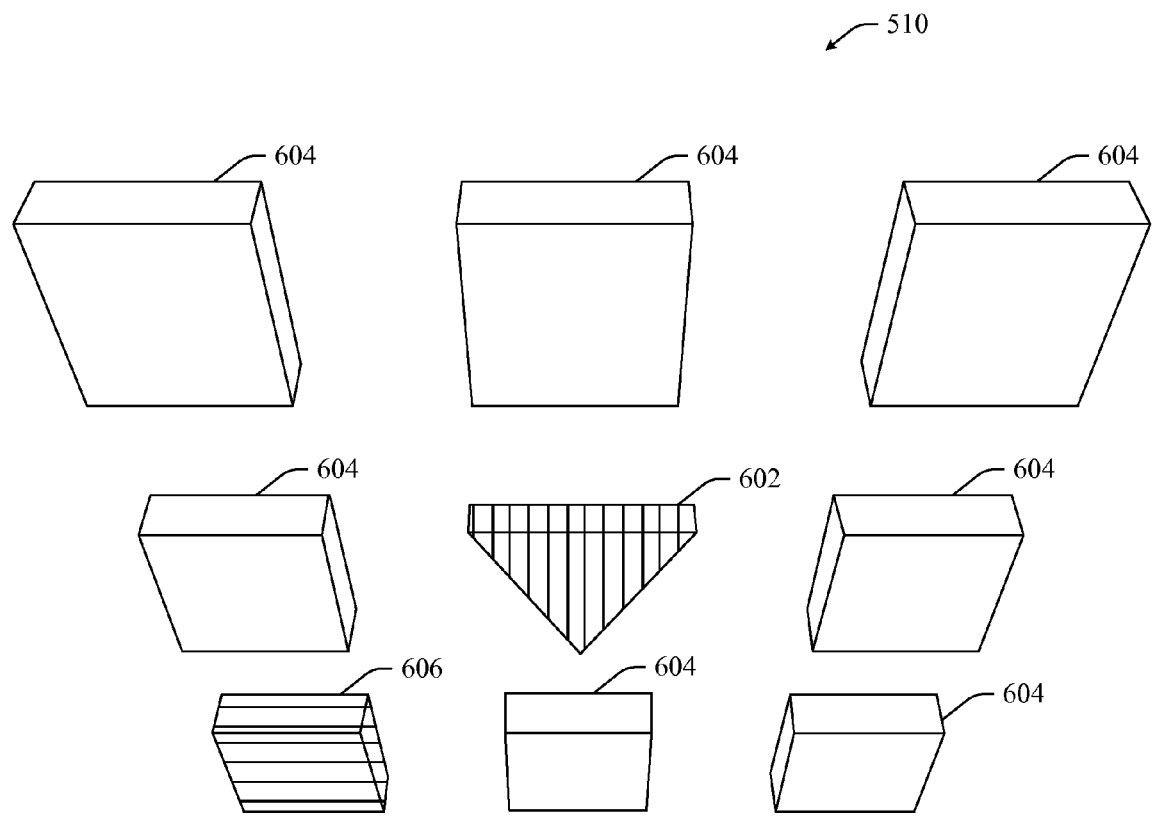
FIG. 6 shows an example safety grid in accordance with aspects of the disclosure.

FIG. 6 shows an example safety grid 510 in accordance with aspects of the disclosure. As seen in FIG. 6, a vehicle associated with safety grid 510 (e.g., vehicle 304) can be represented by a central icon 602, which can be indicated in one or more of a different color, pattern, size, shape, etc. The various sectors around vehicle 304 (e.g., 410-424) can be represented by icons 604 or 606, wherein one type of icon (e.g., 604) can be used if no potential hazards (e.g., other vehicles, etc.) are detected in that sector, and another type 606 can be used if a potential hazard is detected, wherein types 604 and 606 can differ visually in some way (e.g., size, shape, color, pattern, etc.).

Figure 7:
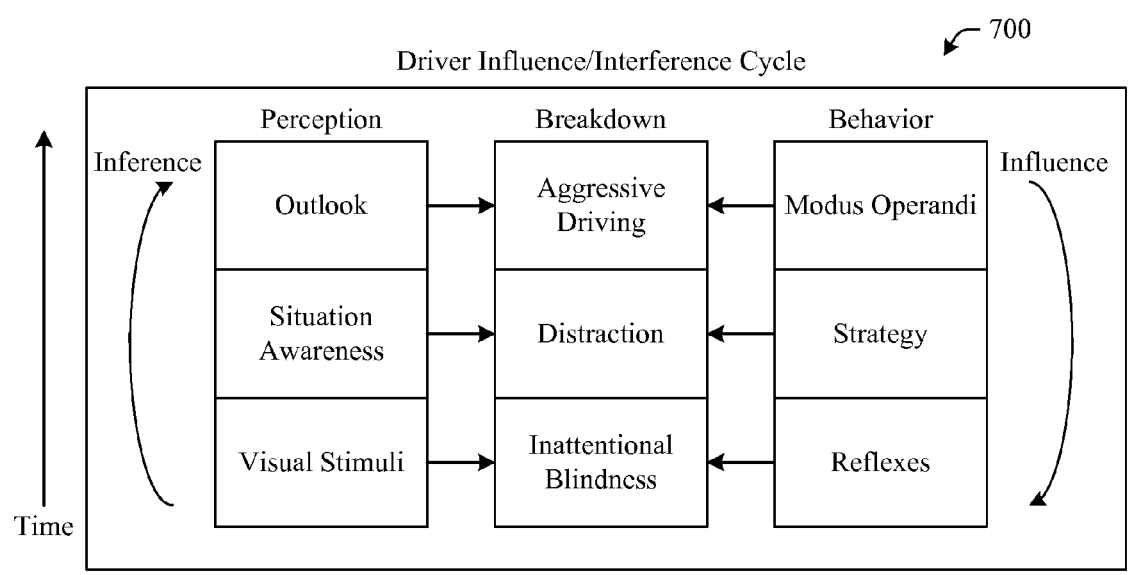
FIG. 7 illustrates a table for a driver influence/inference cycle.

FIG. 7 shows a three-tier hierarchy of driver perception and behavior diagram 700. The lowest levels are the most immediate interaction with the environment. A driver senses the outside world by moving shapes and colors, and can react quickly using motor reflexes. In the middle level, drivers form an understanding of their situation, knowing where they are with respect to other cars or pedestrians and develop strategies for navigating around the environment. At the highest level, drivers develop their attitude towards driving and towards other road users. Behaviorally, the way a driver chooses to interact in the world can be described as their modus operandi. For instance, consistently preferring safer routes because an individual has children is an outlook and modus operandi goes beyond a single instance in time.

With reference to FIG. 7, at each of these three levels, breakdowns in awareness and performance can occur as depicted at 700. At the lowest level, inattentional blindness happens when drivers fail to perceive stimuli in plain sight, due to attention being focused elsewhere. At the middle level, driver distraction can occur when the primary task of driving is competing with one or more secondary tasks (e.g. missing a turn while on a mobile phone conversation). At the top level, an example of a breakdown in outlook and modus operandi would be aggressive driving. Tailgating, speeding, and treating pedestrians aggressively are behaviors that are dangerous, and can be attributed to a lack of empathy to others and unhealthy risk-taking. Typically, safety solutions only focus at one level exclusively, such as emitting alarms when a pedestrian is close to a car. The disclosure proposes that consideration of all levels of perception and behavior can lead to more effective, preventative solutions to safety.

Lower levels of perception lead to higher levels of state inference or awareness. On the other hand, the higher levels of behavior influence the selection of lower levels of behavior. For instance, aggressive driving manifests itself in breakdowns in driving strategy, such as frequent lane changes, and the result can be the inability to notice or react to a vehicle on a collision course with the driver. Inference occurs in that noticing situations over time can shape an individual's outlook, or vice versa; an individual's outlook can prime the way they perceive situations. Behaviorally, deciding to be a safe driver, a change in modus operandi, can lead to defensive driving strategies, which can prepare a driver to react correctly to sudden hazards.

All of these levels influence how one chooses to represent information using AR through the crucial element of engagement. Because driver inattention and distraction is likely to occur when performing routine and unchallenging tasks such as daily commutes, we posit that an approach that focuses on engaging the driver in the primary task of driving will diminish the need or desire to switch attention to secondary tasks such as texting.

Flow is the state of engagement when an individual has become so consumed with what they are doing that they are in a state of elevated performance and awareness. A situation must satisfy certain pre-requisites in order to make flow possible. There must be a slight challenge, such that their abilities are stretched, clear goals, and immediate feedback. A commuting driver generally does not experience the conditions conducive to flow. The driver has no sense of goals or challenge, no reward for good driving behavior, and there is no feedback on their performance beyond the bare minimum baseline of staying out of a collision. In this mundane scenario, a driver enters a state of malaise and, given the opportunity, will turn to something more engaging such as flipping through radio stations or checking their text messages.

In accordance with the disclosure, an approach for engaging the driver seeks to use AR in a windshield display to alter the driver's perception to create the conditions for flow. The goal is to encourage the driver to drive skillfully, become aware of best practices, and develop consideration for others who share the road.

It is believed that engaging the driver to improve their performance along all three levels of driver perception and behavior can significantly increase driver safety. The innovation illustrates a design approach with a selection of artifacts conceived and prototyped: a safety grid, a smooth merge aid and a pedestrian yield indicator. It should be noted that the AR visual concepts employ 3-D geometry meant to appear in the road context, which is critical to maintaining the driver's immersion in the real 3-D world.

The disclosure considered the groups in the greatest need as a first priority. Beginner drivers and elderly are especially at risk because of their lack of experience and diminished perceptual abilities, respectively. Therefore, the innovation designs the AR assistance to be suggestive of correct driving actions to take and visually easy to see. In a sense, the AR concept presented aims to take average drivers and give them the awareness, skill, and outlook of an expert driver. Interviews were conducted with young and senior age groups to understand our target user. To design the ideal driving behavior scenarios, ride-along research was done with expert drivers in order to better understand how they think and behave behind the wheel. What was gained from this understanding was translated into visual AR assistance for non-expert users.

Figure 8:
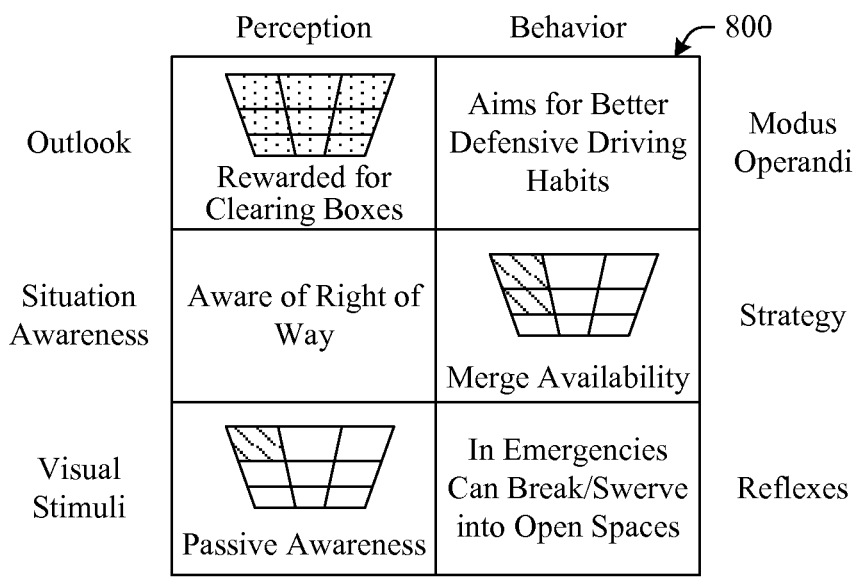
FIG. 8 illustrates a table for analysis of a safety grid.

Defensive driving means being aware of cars around you at all times, and proactively creating situations to minimize the need to take sudden action. Expert drivers develop habits that optimize the safe space around their car. With continued reference back to FIG. 6, the safety grid 510 represents the car's immediate neighboring eight spaces (with the car being the center tile), creating an awareness of the car's surroundings. FIG. 8 uses the disclosure's model to show how the design improves driving perception and behavior 800. The ideal action to take is to free up all the spaces, so they turn blue, thereby awarding safe driving points to the driver. In an emergency scenario where a car on a collision course with the driver appears, the driver can take corrective action by moving into one of the unoccupied boxes to the side or rear of the driver's car, which he or she will already be aware of due to the grid's constant feedback.

For example, merging onto highways is a scenario that induces stress in many drivers, especially older or inexperienced drivers. The erroneous behavior here is to slow down, as a sort of timid response to the high speeds of the freeway. Expert drivers, however, will know that the best way to merge is to speed up along the on-ramp quickly and smoothly to match the highway speed, spot a place on the closest lane with an open space in between cars, and merge. A green visual aid paints a spot on the ground that moves at the speed of the drivers on the highway. The driver is meant to match speeds and merge onto the guides. Meanwhile, a line is painted ahead of the car in the best path the driver should take.

Figure 9:
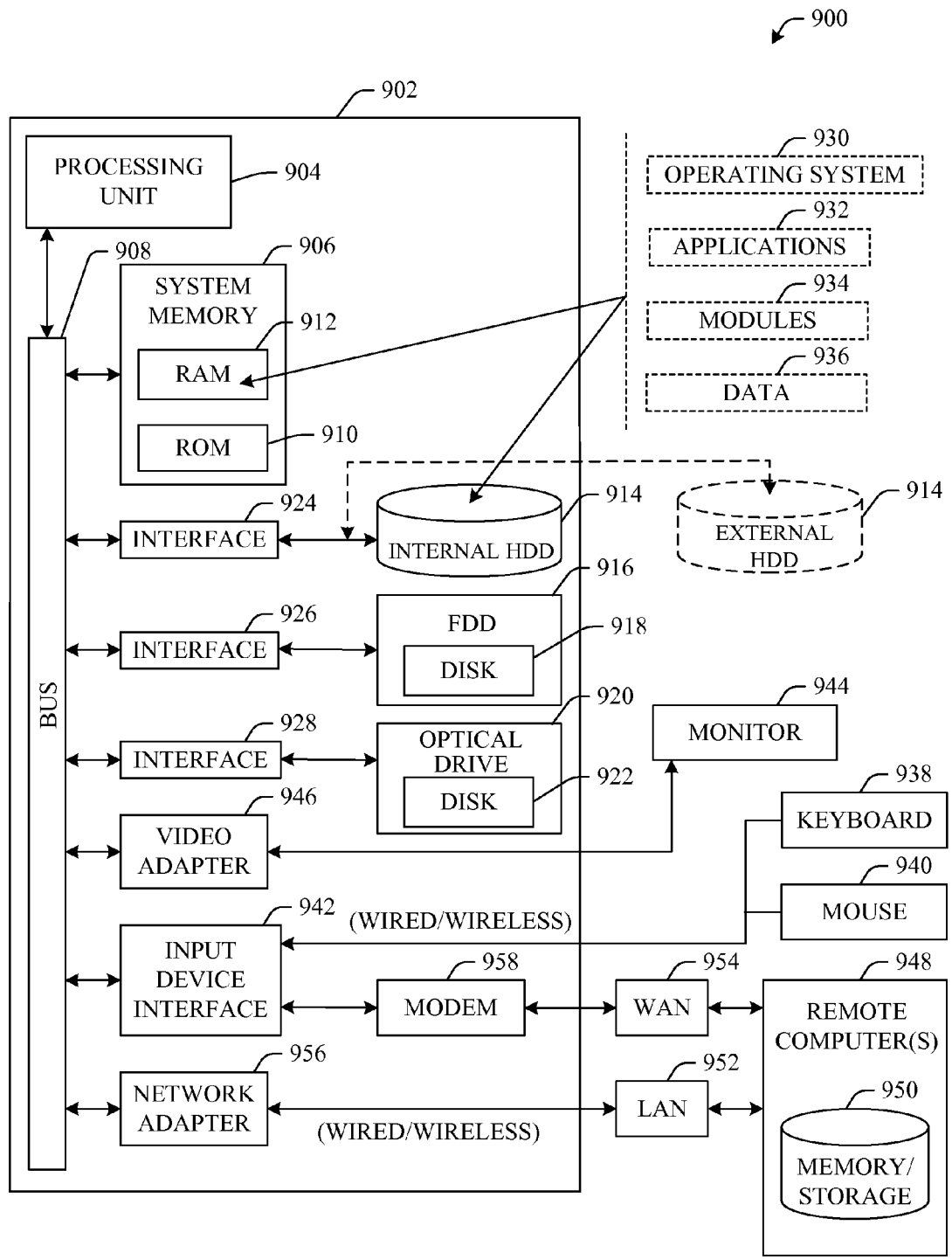
FIG. 9 illustrates a block diagram of a computer operable to execute the disclosed architecture.

Referring now to FIG. 9, there is illustrated a block diagram of a computer operable to execute the disclosed architecture. In order to provide additional context for various aspects of the subject disclosure, FIG. 9 and the following discussion are intended to provide a brief, general description of a suitable computing environment 900 in which the various aspects of the disclosure can be implemented. While the disclosure has been described above in the general context of computer-executable instructions that can run on one or more computers, those skilled in the art will recognize that the disclosure also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the disclosure can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, the exemplary environment 900 for implementing various aspects of the disclosure includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 can also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916, and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the subject disclosure.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the exemplary operating environment, and further, that any such media can contain computer-executable instructions for performing the methods of the disclosure.

A number of program modules can be stored in the drives and RAM 912, including an operating system 930, one or more application programs 932, other program modules 934, and program data 936. All or portions of the operating system, applications, modules, and/or data can also be cached in the RAM 912. It is appreciated that the disclosure can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) can include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 can operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 is connected to the local network 952 (within the vehicle 304 (FIG. 3) through a wired and/or wireless communication network interface or adapter 956. The adapter 956 can facilitate wired or wireless communication to the LAN 952, which can also include a wireless access point disposed thereon for communicating with the wireless adapter 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The applications 932 can include an AR driving control 130 that performs certain operations as described herein, for example.

Figure 10:
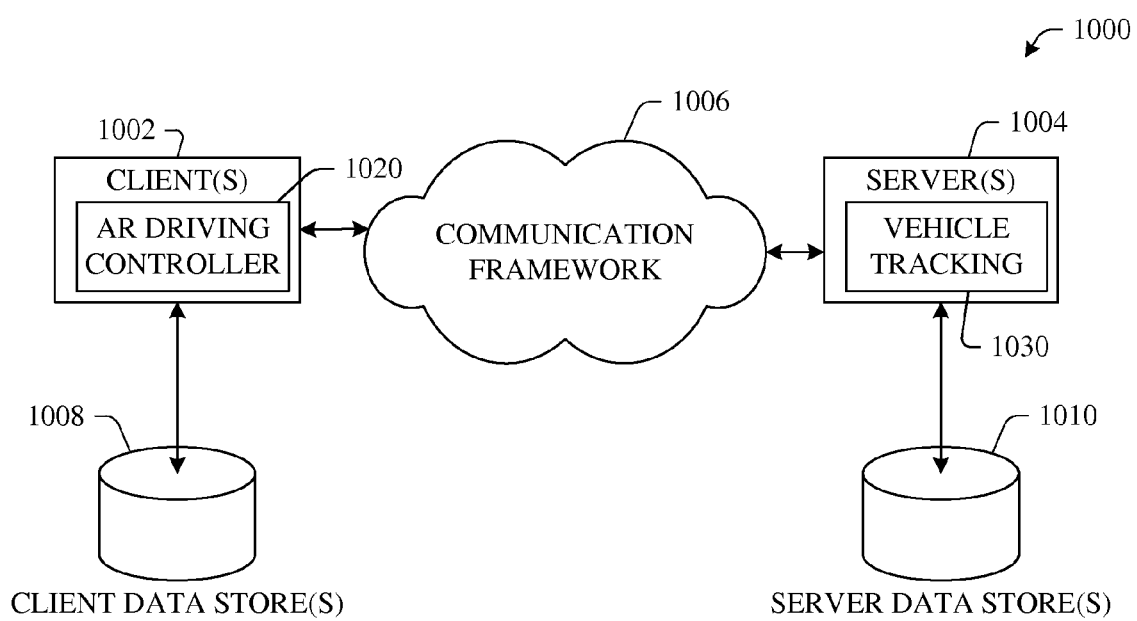
FIG. 10 illustrates a schematic block diagram of an exemplary computing environment in accordance with the subject disclosure.

Referring now to FIG. 10, there is illustrated a schematic block diagram of an exemplary computing environment 1000 in accordance with the subject disclosure. The system 1000 includes one or more client(s) 1002. The client(s) 1002 can be hardware and/or software (e.g., threads, processes, computing devices). The client(s) 1002 can house cookie(s) and/or associated contextual information by employing the disclosure, for example.

The system 1000 also includes one or more server(s) 1004. The server(s) 1004 can also be hardware and/or software (e.g., threads, processes, computing devices). The servers 1004 can house threads to perform transformations by employing the disclosure, for example. One possible communication between a client 1002 and a server 1004 can be in the form of a data packet adapted to be transmitted between two or more computer processes. The data packet can include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

For example, the client(s) 1002 can locally host an AR driving controller 1020 that performs certain operations described herein that cooperates with a vehicle tracking instance 1030 that is hosted on server(s) 1004 that performs certain other operations described herein.

What has been described above includes examples of the disclosure. It is, of course, not possible to describe every conceivable combination of components or methodologies for purposes of describing the subject disclosure, but one of ordinary skill in the art can recognize that many further combinations and permutations of the disclosure are possible. Accordingly, the disclosure is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

By benefit of the foregoing, it should be appreciated that a query component that generally includes a rule engine component and a rule evaluation component can be used for performing one or more of the operations described herein. In accordance with this alternate aspect, an implementation scheme (e.g., rule) can be applied to define and/or implement a query. It will be appreciated that the rule-based implementation can automatically and/or dynamically define and implement a query of a data store. In response thereto, the rule-based implementation can select data component(s) included within the result(s) by employing a predefined and/or programmed rule(s) based upon any desired criteria (e.g., file type, file size, hardware characteristics).

By way of example, a user can establish a rule that can implement a query of a preferred type of file (e.g., route). Thereby, a user input can be inferred, planned or otherwise pre-determined. In this exemplary aspect, the rule can be constructed to select all route files from a targeted data store or source location. Accordingly, a result set of data components can be obtained, previewed and/or manipulated as desired. Once finalized, a container (e.g., dynamic list) can be generated and stored in a desired location and/or device. It will be appreciated that any of the specifications utilized in accordance with the subject disclosure can be programmed into a rule-based implementation scheme.

In the exemplary aspect, the rule engine component can be programmed or configured in accordance with a user-defined preference. As well, a rule can be established in accordance with a specific hardware configuration or in accordance with a software application. For example, a rule can be constructed in accordance with specific memory capacity and/or display of a device. In other words, as previously discussed, a rule can be established to take into consideration the specific limitations of a hardware device (e.g., display mechanism).

The rule evaluation component facilitates application of the rule. Based upon the output of the rule evaluation component, the query component can return the results thus effecting establishment of appropriate associations by the dynamic list component as discussed supra.

Certain components that perform operations described herein can employ an artificial intelligence (AI) component which facilitates automating one or more features in accordance with the subject disclosure. A classifier is a function that maps an input attribute vector, $x=(x1, x2, x3, x4, xn)$, to a confidence that the input belongs to a class, that is, $f(x)$ =confidence (class). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject disclosure can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria.

What is claimed is:

1. A method for safely guiding a vehicle driver to perform a left turn, comprising:
   detecting a left turn based upon proximity and speed for a vehicle;
   determining a current position and a relative vector for an oncoming vehicle in a lane for opposing traffic that is approaching the left turn;
   three dimensionally mapping a forward view including the oncoming vehicle; and
   spatially overlaying an augmented reality display on a volumetric heads up display for a driver of the vehicle by projecting a target path of the oncoming vehicle based upon the position and relative vector and by projecting a left turn path.

2. The method of claim 1, comprising projecting the target path for a calculated time in which the vehicle will cross the opposing left during the left turn.

3. The method of claim 1, comprising overlaying the augmented reality display with an extended left turn graphic in response to determining a nonintersecting path and with a shortened left turn in response to determining an intersecting path.

4. The method of claim 1, wherein detecting the left turn comprises:
   accessing a digital map, a location of the vehicle, and a current trajectory of the vehicle; and
   receiving a user input indicative of a planned left turn.

5. The method of claim 4, comprising receiving the user input indicative of the planned left turn by receiving a route map based upon the digital map.

6. The method of claim 4, comprising receiving the user input indicative of the planned left turn by receiving a left turn signal.

7. The method of claim 1, comprising:
   detecting a width of the oncoming vehicle; and
   projecting the target path having the width.

8. An augmented reality driver system to safely guide a vehicle driver to perform a left turn, comprising:
   a vehicle navigator to detect a left turn based upon proximity and speed for a vehicle;
   a target sensor to determine a current position and a relative vector for an oncoming vehicle in a lane for opposing traffic that is approaching the left turn;
   a volumetric heads up display; and
   an augmented reality controller to three dimensionally map a forward view including the oncoming vehicle, to direct the volumetric heads up display to project a target path of the oncoming vehicle based upon the position and relative vector, and to direct the volumetric heads up display to project a left turn path for the vehicle.

9. The augmented reality driver system of claim 8, wherein the augmented reality controller projects the target path for a calculated time in which the vehicle will cross the opposing left during the left turn.

10. The augmented reality driver system of claim 8, wherein the augmented reality controller directs the volumetric heads up display to project an extended left turn graphic indicative of a safe turn in response to determining a nonintersecting path and with a shortened left turn indicative of an unsafe turn in response to determining an intersecting path.

11. The augmented reality driver system of claim 8, wherein the vehicle navigator detects the left turn by:
  accessing a digital map, a location of the vehicle, and a current trajectory of the vehicle; and
  receiving a user input indicative of a planned left turn.

12. The augmented reality driver system of claim 11, wherein the vehicle navigator receives the user input indicative of the planned left turn by receiving a route map based upon the digital map.

13. The augmented reality driver system of claim 11, wherein the vehicle navigator receives the user input indicative of the planned left turn by receiving a left turn signal.

14. The augmented reality driver system of claim 11, wherein the target sensor detects a width of the oncoming vehicle; and
  wherein the augmented reality controller directs the volumetric heads up display to project the target path having the width.

15. A device for safely guiding a vehicle driver to perform a left turn, comprising:
  a volumetric heads up display; and
  a controller in communication with the volumetric heads up display, wherein the controller comprises at least one processor that executes software instructions to perform operations comprising:
    detecting a left turn based upon proximity and speed for a vehicle,
    determining a current position and a relative vector for an oncoming vehicle in a lane for opposing traffic that is approaching the left turn,
    three dimensionally mapping a forward view including the oncoming vehicle, and
    spatially overlaying an augmented reality display on the volumetric heads up display for a driver of the vehicle by projecting a target path of the oncoming vehicle based upon the position and relative vector and by projecting a left turn path.

16. The device of claim 15, wherein the controller performs operations that comprise projecting the target path for a calculated time in which the vehicle will cross the opposing left during the left turn.

17. The device of claim 15, wherein the controller performs operations that comprise overlaying the augmented reality display with an extended left turn graphic in response to determining a nonintersecting path and with a shortened left turn in response to determining an intersecting path.

18. The device of claim 15, wherein the controller performs operations that comprise detecting the left turn further by:
  accessing a digital map, a location of the vehicle, and a current trajectory of the vehicle, and
  receiving a user input indicative of a planned left turn.

19. The device of claim 18, wherein the controller receives the user input indicative of the planned left turn by obtaining a route map based upon the digital map.

20. The device of claim 18, wherein the controller performs operations that comprise receiving the user input indicative of the planned left turn by receiving a left turn signal.

* * * * *